US006771666B2

(12) United States Patent
Barker, Jr.

(10) Patent No.: US 6,771,666 B2
(45) Date of Patent: Aug. 3, 2004

(54) SYSTEM AND METHOD FOR TRANS-MEDIUM ADDRESS RESOLUTION ON AN AD-HOC NETWORK WITH AT LEAST ONE HIGHLY DISCONNECTED MEDIUM HAVING MULTIPLE ACCESS POINTS TO OTHER MEDIA

(75) Inventor: Charles R. Barker, Jr., Orlando, FL (US)

(73) Assignee: MeshNetworks, Inc., Maitland, FL (US)

( * ) Notice: Subject to any disclaimer, the term of this patent is extended or adjusted under 35 U.S.C. 154(b) by 16 days.

(21) Appl. No.: 10/253,646

(22) Filed: Sep. 25, 2002

(65) Prior Publication Data

US 2003/0174682 A1 Sep. 18, 2003

Related U.S. Application Data

(60) Provisional application No. 60/364,023, filed on Mar. 15, 2002.

(51) Int. Cl.[7] ............................................. H04J 3/24
(52) U.S. Cl. ............. 370/475; 370/395.54; 370/389
(58) Field of Search .................. 370/475, 465, 370/310, 312, 328, 329, 349, 351, 352, 389, 390, 392, 393, 395.5, 395.52, 395.54, 400, 401, 229, 235, 331, 332, 338, 466, 471; 455/403, 422.1, 432.1, 436, 450

(56) References Cited

U.S. PATENT DOCUMENTS

| 4,494,192 A | 1/1985 | Lew et al. ................. 364/112 |
| 4,617,656 A | 10/1986 | Kobayashi et al. ........ 370/445 |
| 4,736,371 A | 4/1988 | Tejima et al. ............. 370/236 |
| 4,742,357 A | 5/1988 | Rackley .................... 342/457 |
| 4,747,130 A | 5/1988 | Ho .......................... 379/269 |
| 4,910,521 A | 3/1990 | Mellon ..................... 342/45 |
| 5,034,961 A | 7/1991 | Adams ..................... 375/130 |

(List continued on next page.)

FOREIGN PATENT DOCUMENTS

| CA | 2132180 | 3/1996 |
| EP | 0513841 A2 | 11/1992 |
| EP | 0924890 A2 | 6/1999 |
| FR | 2683326 | 7/1993 |
| WO | WO 9608884 | 3/1996 |
| WO | WO 9724005 | 7/1997 |
| WO | WO 9839936 | 9/1998 |
| WO | 0627827 A2 | 3/1999 |
| WO | WO 9912302 | 3/1999 |
| WO | WO 0034932 | 6/2000 |
| WO | WO 01101154 | 2/2001 |
| WO | WO 0133770 | 5/2001 |
| WO | WO 0135567 | 5/2001 |
| WO | WO 0137481 | 5/2001 |
| WO | WO 0137482 | 5/2001 |
| WO | WO 0137483 | 5/2001 |
| WO | WO 0235253 | 5/2002 |

OTHER PUBLICATIONS

Wong et al., "Soft Handoffs in CDMA Mobile Systems", Dec. 1997, IEEE Personal Communications.

(List continued on next page.)

*Primary Examiner*—Brian Nguyen
(74) *Attorney, Agent, or Firm*—Gardner Carton & Douglas LLP; Joseph J. Buczynski

(57) ABSTRACT

A system and method for providing a mechanism for trans-medium address resolution on a network with at least one highly disconnected medium having multiple access points to other media. The system and method provides a "unique" media access control (MAC) address in address resolution protocol (ARP) for mobile nodes in an ad-hoc network, correctly identifying the optimum intelligent access point (IAP) for node communication where the optimum IAP changes more rapidly than traditional address updating may be able to accommodate. Medium layer routing protocols recognize medium frames addressed with this unique MAC address should be routed to the currently associated IAP, whichever IAP that might be at the moment the frame is sent.

20 Claims, 3 Drawing Sheets

U.S. PATENT DOCUMENTS

| | | | |
|---|---|---|---|
| 5,068,916 A | 11/1991 | Harrison et al. | 455/39 |
| 5,231,634 A | 7/1993 | Giles et al. | 370/348 |
| 5,233,604 A | 8/1993 | Ahmadi et al. | 370/238 |
| 5,241,542 A | 8/1993 | Natarajan et al. | 370/311 |
| 5,317,566 A | 5/1994 | Joshi | 370/238 |
| 5,392,450 A | 2/1995 | Nossen | 455/12.1 |
| 5,412,654 A | 5/1995 | Perkins | 370/312 |
| 5,424,747 A | 6/1995 | Chazelas | 342/70 |
| 5,502,722 A | 3/1996 | Fulghum | 370/343 |
| 5,517,491 A | 5/1996 | Nanni et al. | 370/252 |
| 5,555,425 A | 9/1996 | Zeller et al. | 710/110 |
| 5,555,540 A | 9/1996 | Radke | 370/462 |
| 5,572,528 A | 11/1996 | Shuen | 370/402 |
| 5,615,212 A | 3/1997 | Ruszczyk et al. | 370/433 |
| 5,618,045 A | 4/1997 | Kagan et al. | 463/40 |
| 5,621,732 A | 4/1997 | Osawa | 370/346 |
| 5,623,495 A | 4/1997 | Eng et al. | 370/397 |
| 5,627,976 A | 5/1997 | McFarland et al. | 710/309 |
| 5,631,897 A | 5/1997 | Pacheco et al. | 370/237 |
| 5,644,576 A | 7/1997 | Bauchot et al. | 370/437 |
| 5,652,751 A | 7/1997 | Sharony | 370/227 |
| 5,680,392 A | 10/1997 | Semaan | 370/261 |
| 5,684,794 A | 11/1997 | Lopez et al. | 370/337 |
| 5,687,194 A | 11/1997 | Paneth et al. | 375/283 |
| 5,696,903 A | 12/1997 | Mahany | 709/228 |
| 5,701,294 A | 12/1997 | Ward et al. | 370/252 |
| 5,706,428 A | 1/1998 | Boer et al. | 370/342 |
| 5,717,689 A | 2/1998 | Ayanoglu | 370/349 |
| 5,745,483 A | 4/1998 | Nakagawa et al. | 370/335 |
| 5,774,876 A | 6/1998 | Woolley et al. | 705/28 |
| 5,781,540 A | 7/1998 | Malcolm et al. | 370/321 |
| 5,787,080 A | 7/1998 | Hulyalkar et al. | 370/310.2 |
| 5,794,154 A | 8/1998 | Bar-On et al. | 455/509 |
| 5,796,732 A | 8/1998 | Mazzola et al. | 370/362 |
| 5,796,741 A | 8/1998 | Saito et al. | 370/439 |
| 5,805,593 A | 9/1998 | Busche | 370/396 |
| 5,805,842 A | 9/1998 | Nagaraj et al. | 710/313 |
| 5,805,977 A | 9/1998 | Hill et al. | 340/7.22 |
| 5,809,518 A | 9/1998 | Lee | 711/115 |
| 5,822,309 A | 10/1998 | Ayanoglu et al. | 370/315 |
| 5,844,905 A | 12/1998 | McKay et al. | 370/443 |
| 5,845,097 A | 12/1998 | Kang et al. | 710/117 |
| 5,857,084 A | 1/1999 | Klein | 710/305 |
| 5,870,350 A | 2/1999 | Bertin et al. | 365/233 |
| 5,877,724 A | 3/1999 | Davis | 342/357.1 |
| 5,881,095 A | 3/1999 | Cadd | 375/132 |
| 5,881,372 A | 3/1999 | Kruys | 455/113 |
| 5,886,992 A | 3/1999 | Raatikainen et al. | 370/410 |
| 5,896,561 A | 4/1999 | Schrader et al. | 455/67.11 |
| 5,903,559 A | 5/1999 | Acharya et al. | 370/355 |
| 5,909,651 A | 6/1999 | Chander et al. | 455/466 |
| 5,936,953 A | 8/1999 | Simmons | 370/364 |
| 5,943,322 A | 8/1999 | Mayor et al. | 370/280 |
| 5,987,011 A | 11/1999 | Toh | 370/331 |
| 5,987,033 A | 11/1999 | Boer et al. | 370/445 |
| 5,991,279 A | 11/1999 | Haugli et al. | 370/311 |
| 6,028,853 A | 2/2000 | Haartsen | 370/338 |
| 6,029,217 A | 2/2000 | Arimilli et al. | 710/107 |
| 6,034,542 A | 3/2000 | Ridgeway | 326/39 |
| 6,044,062 A | 3/2000 | Brownrigg et al. | 370/238 |
| 6,047,330 A | 4/2000 | Stracke, Jr. | 709/238 |
| 6,052,594 A | 4/2000 | Chuang et al. | 455/450 |
| 6,052,752 A | 4/2000 | Kwon | 710/306 |
| 6,064,626 A | 5/2000 | Stevens | 365/233 |
| 6,067,291 A | 5/2000 | Kamerman et al. | 370/338 |
| 6,073,005 A | 6/2000 | Raith et al. | 455/404.1 |
| 6,078,566 A | 6/2000 | Kikinis | 370/286 |
| 6,104,712 A | 8/2000 | Robert et al. | 370/389 |
| 6,108,738 A | 8/2000 | Chambers et al. | 710/113 |
| 6,115,580 A | 9/2000 | Chuprun et al. | 455/1 |
| 6,122,690 A | 9/2000 | Nannetti et al. | 710/311 |
| 6,130,881 A | 10/2000 | Stiller et al. | 370/238 |
| 6,130,892 A | 10/2000 | Short et al. | 370/401 |
| 6,132,306 A | 10/2000 | Trompower | 453/11.1 |
| 6,147,975 A | 11/2000 | Bowman-Amuah | 370/252 |
| 6,163,699 A | 12/2000 | Naor et al. | 455/453 |
| 6,178,337 B1 | 1/2001 | Spartz et al. | 455/561 |
| 6,192,053 B1 | 2/2001 | Angelico et al. | 370/448 |
| 6,192,230 B1 | 2/2001 | Van Bokhorst et al. | 455/343.3 |
| 6,208,870 B1 | 3/2001 | Lorello et al. | 455/466 |
| 6,223,240 B1 | 4/2001 | Odenwald et al. | 710/311 |
| 6,240,294 B1 | 5/2001 | Hamilton et al. | 455/456.3 |
| 6,246,875 B1 | 6/2001 | Seazholtz et al. | 455/432.1 |
| 6,249,516 B1 | 6/2001 | Brownrigg et al. | 370/338 |
| 6,275,707 B1 | 8/2001 | Reed et al. | 455/456.3 |
| 6,285,892 B1 | 9/2001 | Hulyalkar | 455/574 |
| 6,304,556 B1 | 10/2001 | Haas | 370/254 |
| 6,307,843 B1 * | 10/2001 | Okanoue | 370/312 |
| 6,327,300 B1 | 12/2001 | Souissi et al. | 375/219 |
| 6,349,091 B1 | 2/2002 | Li | 370/238 |
| 6,349,210 B1 | 2/2002 | Li | 455/450 |
| 6,363,065 B1 | 3/2002 | Thornton et al. | 370/352 |
| 2001/0005368 A1 * | 6/2001 | Rune | 370/390 |
| 2001/0024443 A1 * | 9/2001 | Alriksson et al. | 370/401 |
| 2001/0053699 A1 | 12/2001 | McCrady et al. | 455/513 |
| 2002/0044549 A1 * | 4/2002 | Johansson et al. | 370/386 |

OTHER PUBLICATIONS

Wong et al., "A Pattern Recognition System for Handoff Algorithms", Jul. 2000, IEEE Journal on Selected Areas in Communications, vol. 18, No. 7.

Andras G. Valko, "Cellular IP: A New Approach to Internet Host Mobility", Jan. 1999, ACM Computer Communication Review.

Richard North, Dale Bryan and Dennis Baker, "Wireless Networked Radios: Comparison of Military, Commercial, and R&D Protocols", Feb. 28–Mar. 3, 1999, $2^{nd}$ Annual UCSD Conference on Wireless Communications, San Diego CA.

Benjamin B. Peterson, Chris Kmiecik, Richard Hartnett, Patrick M. Thompson, Jose Mendoza and Hung Nguyen, "Spread Spectrum Indoor Geolocation", Aug. 1998, Navigation: Journal of the Institute of Navigation, vol. 45, No. 2, summer 1998.

Josh Broch, David A. Maltz, David B. Johnson, Yih–Chun Hu and Jorjeta Jetcheva, "A Performance Comparison of Multi–Hop Wireless Ad Hoc Network Routing Protocols", Oct. 25–30, 1998, Proceedings of the $4^{th}$ Annual ACM/IEEE International Conference on Mobile Computing and Networking.

C. David Young, "USAP: A Unifying Dynamic Distributed Multichannel TDMA Slot Assignment Protocol".

Chip Elliott and Bob Heile, "Self–Organizing, Self–Healing Wireless Networks", 2000 IEEE.

J.J. Garcia–Luna–Aceves and Asimakis Tzamaloukas, "Reversing the Collision–Avoidance Handshake in Wireless Networks".

J.J. Garcia–Luna–Aceves and Marcelo Spohn, "Transmission–Efficient Routing in Wireless Networks Using Link–State Information".

J.J. Garcia–Luna–Aceves and Ewerton L. Madruga, "The Core–Assisted Mesh Protocol", Aug. 1999, IEEE Journal on Selected Areas in Communications, vol. 17, No. 8.

Ad Kamerman and Gido Aben, "Net Throughput with IEEE 802.11 Wireless LANs".

J.R. McChesney and R.J. Saulitis, "Optimization of an Adaptive Link Control Protocol for Multimedia Packet Radio Networks".

Ram Ramanathan and Regina Rosales–Hain, "Topology Control of Multihop Wireless Networks using Transmit Power Adjustment".

Ram Ramanathan and Martha E. Steenstrup, "Hierarchically–Organized, Multihop Mobile Wireless Networks for Quality–of–Service Support".

Martha E. Steenstrup, "Dynamic Multipoint Virtual Circuits for Multimedia Traffic in Multihop Mobile Wireless Networks".

Zhenyu Tang and J.J. Garcia–Luna–Aceves, "Collision–Avoidance Transmission Scheduling for Ad–Hoc Networks".

George Vardakas and Wendell Kishaba, "QoS Networking With Adaptive Link Control and Tactical Multi–Channel Software Radios".

* cited by examiner

SYSTEM AND METHOD FOR TRANS-MEDIUM ADDRESS RESOLUTION ON AN AD-HOC NETWORK WITH AT LEAST ONE HIGHLY DISCONNECTED MEDIUM HAVING MULTIPLE ACCESS POINTS TO OTHER MEDIA

This application claims benefit under 35 U.S.C. § 119(e) from U.S. Provisional Application Serial No. 60/364,023, filed Mar. 15, 2002, the entire contents of which being incorporated herein by reference.

CROSS-REFERENCE TO RELATED APPLICATIONS

Related subject matter is disclosed in a U.S. Provisional Patent Application of Whitehill et al., entitled "A System and Method for Providing A Congestion Optimized Address Resolution Protocol for Wireless Ad-Hoc Networks", Ser. No. 60/357,645, filed Feb. 20, 2002, and U.S. Patent Application of Barker et al., entitled "A System and Method for Providing A Congestion Optimized Address Resolution Protocol for Wireless Ad-Hoc Networks", Ser. No. 09/983,176, filed on Oct. 23, 2001, the entire contents of both being incorporated herein by reference.

BACKGROUND OF THE INVENTION

1. Field of the Invention

The present invention relates to a system and method for data routing in an ad-hoc network where optimum mobile node-to-IAP links are constantly changing. More particularly, the present invention relates to a system and method for modifying an address resolution protocol (ARP) mechanism to assign a unique media access control (MAC) address for mobile node's IAP, such that frames addressed with this unique MAC address are routed by medium-layer routing protocols to the node's associated IAP at the time the frame is sent.

2. Description of the Related Art

In recent years, a type of mobile communications network known as an "ad-hoc" network has been developed to address the needs of multiple mobile device communication beyond traditional infrastructure coverage. In this type of network, each user terminal (hereinafter "mobile node") is capable of operating as a base station or router for other mobile nodes within the network, thus eliminating the need for a fixed infrastructure of base stations. Accordingly, data packets being sent from a source mobile node to a destination mobile node are typically routed through a number of intermediate mobile nodes before reaching the destination mobile node. Details of an ad-hoc network are set forth in U.S. Pat. No. 5,943,322 to Mayor, the entire content of which is incorporated herein by reference.

More sophisticated ad-hoc networks are also being developed which, in addition to enabling mobile nodes to communicate with each other as in conventional ad-hoc networks, further enable the mobile nodes to access a fixed network and thus, communicate with other types of user terminals, such as those on the public switched telephone network (PSTN) and on other networks, such as the Internet. Details of these types of ad-hoc networks are described in U.S. patent application Ser. No. 09/897,790 entitled "Ad Hoc Peer-to-Peer Mobile Radio Access System Interfaced to the PSTN and Cellular Networks", filed on Jun. 29, 2001, in U.S. patent application Ser. No. 09/815,157 entitled "Time Division Protocol for an Ad-Hoc, Peer-to-Peer Radio Network Having Coordinating Channel Access to Shared Parallel Data Channels with Separate Reservation Channel", filed on Mar. 22, 2001, and in U.S. patent application Ser. No. 09/815,164 entitled "Prioritized-Routing for an Ad-Hoc, Peer-to-Peer, Mobile Radio Access System", filed on Mar. 22, 2001, the entire content of each being incorporated herein by reference.

Generally, all of the nodes in a wireless ad-hoc peer-to-peer network provide certain similar core services and functionality, although they can each provide different functions relating to their specific purpose and application (e.g. if they are an access point, wireless router, and so on). Therefore peer-to-peer networks distinguish themselves from infrastructure networks where one or more nodes offer a superset of the functionality of the rest of the network. Infrastructure nodes in these networks typically can handle Dynamic Host Configuration Protocol (DHCP), Address Resolution Protocol (ARP), as well as other services that depend on broadcast traffic. DHCP is defined by IETF RFC 2131 and 2132, which are incorporated herein by reference, and is used by a client node to automatically obtain network settings from a central server. These network settings include the client's IP address, the address of Domain Name Servers (DNS), the IP address of default gateways, and many other network settings. Address resolution protocol is defined by STD 0037 and RFC 0826, which are incorporated herein by reference, and is used by a network node to map IP addresses to MAC addresses so IP traffic can be delivered to specific hardware.

These infrastructure nodes are normally discovered by broadcast traffic advertisements from their client nodes in a network, however peer-to-peer networks typically do not contain specialized infrastructure nodes. The IEEE 802.11 standard offers a peer-to-peer mode in addition to an infrastructure mode. Details of the 802.11 standards are set forth in ISO/IEC 8802-11, ANSI/IEEE 802.11 "Information Technology-Telecommunications and Information Exchange Between Systems-Local and Metropolitan Area Network Specific Requirements", Part 11: Wireless Medium Access Control (MAC) and Physical Layer (PHY) Specifications, the entire contents of which being incorporated herein by reference. Also, a description of the 802.11 standard is found in a book by Bob O'Hara and Al Petrick entitled *IEEE 802.11 Handbook: A Designer's Companion*, IEEE, 1999, the entire contents of which being incorporated herein by reference.

These packet-switched networks can operate across many different kinds of physical hardware by using network-layer routers, such as Internet protocol (IP) routers, with multiple hardware interfaces at junctions where the different hardware mediums must communicate. In the case of fully connected multiple-access hardware mediums, such as CSMA-CD LAN's, where all nodes can directly communicate to all other nodes via hardware broadcasts, media converters can also be inserted into the network to operate below the network layer and pass hardware frames between two different mediums, such as with a 10base2-to-10baseT media converter. In this manner, a media converter can allow a single network-layer routing domain to span multiple hardware media.

However, in an ad-hoc networking system, all routing is done below the network layer since frames in the unified network layer sub-net may be intended for nodes within either the media, wired or wireless network. Therefore, routing methods must be adapted to cross any media junctures below the network layer. However, a media converter would not fit the need because the wireless medium is highly disconnected. That is, nodes in the wireless network may not hear frames from other nodes that are geographically or electrically distant, or occupy different data channels at the time of transmission. In certain ad-hoc networks, intelligent access points (IAP's) are connected to bridge the wired and wireless media, as network efficiency dictates that there be many diverse access points to the wired network. Details of these requirements are described in U.S. patent application Ser. No. 09/897,790, 09/815,157 and 09/815,164, referenced above.

Because the wireless network is not fully connected, the IAP's act as proxies rather than as media converters. Whereas a LAN media converter would hear all frames from all nodes on one medium and directly replicate them on the opposing medium, frames that must cross from the wireless medium to the wired medium in an ad-hoc network are medium-addressed directly to an access point below the network layer to ensure delivery, since the source of the frame may not be within direct transmission range of an access point. In such cases, broadcast services and address resolution protocol (ARP) are handled through special tunneling mechanisms, such as address resolution protocol. Unicast frames that must cross the media carry unicast addressing, particular to the given medium, that specifies a particular IAP.

As noted, address resolution within the ad-hoc network is difficult due to the replacement of traditional LAN components with a wireless network. Whereas in a LAN, ARP may broadcast a request packet for unknown addresses with little impact, in a wireless network such broadcasts could flood the radio network. As disclosed in U.S. Provisional Patent Application Serial No. 60/357,645 to Whitehill et al. referenced above, modifications to the use of ARP satisfies the broadcast concerns of address resolution issues within ad-hoc networks, however the mobility of nodes in the network results in a need for yet further modifications.

Node mobility poses additional problems for traditional ARP uses, as address resolutions made by ARP are generally cached. Cached address resolutions work well for wired-to-wired or wireless-to-wireless unicast communications, as it reduces the need to resolve every network packet individually. Network addresses are resolved to medium addresses once, then cached for future network packets. In a typical implementation, this cache may have an expiration timeout on the order of 20–120 minutes. Upon timeout, a given network address will be re-resolved to ensure reliable resolution for situations where network addresses of given nodes change periodically, such as the case with a DHCP-managed network. When a wireless node resolves network addresses of devices on the wired medium, a medium address is determined that correlates to the node's associated IAP and which is presumed to be the "best" media bridge for the node to use. The best IAP may be selected based on bandwidth, spectral efficiency, or other reasons specific to the network. To provide this functionality, the ARP mechanism is implemented in such a way as to offer the medium address of a node's associated IAP when resolving network addresses of wired nodes. However, given node mobility, the best IAP may not be static for a given mobile node. In such a network, IAP associations may be formed and broken at a higher rate than the ARP expiration timeout would correct for. While the wireless network might allow routing to less-appropriate IAP's, the network would not operate very efficiently. Furthermore, security issues might not allow a non-associated IAP to proxy for a given wireless node.

Accordingly, a need exists for a system and method for modifying the ARP mechanism to assign a medium address for a mobile node's associated IAP in which the optimum IAP is targeted.

SUMMARY OF THE INVENTION

An object of the present invention is to provide a mechanism for trans-medium address resolution on a network with at least one highly disconnected medium having multiple access points to other media.

Another object of the present invention is to provide a system and method for modifying the ARP mechanism to assign a medium address for a mobile node's associated IAP which directs medium-layer routing protocols to route medium frames so addressed to the node's associated IAP at the time the frame is sent.

These and other objects are substantially achieved by providing a system and method for identifying optimum IAP addresses which are subject to change at rates greater than traditional address updating may provide for. Once identified, the system and method provides a "unique" media access control (MAC) address in address resolution protocol (ARP) when wireless nodes are communicating with nodes on a core LAN. Medium layer routing protocols recognize that medium frames addressed with this unique address should be routed to the node's currently associated IAP, whichever IAP that might be at the moment the frame is sent.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

Figure 1:
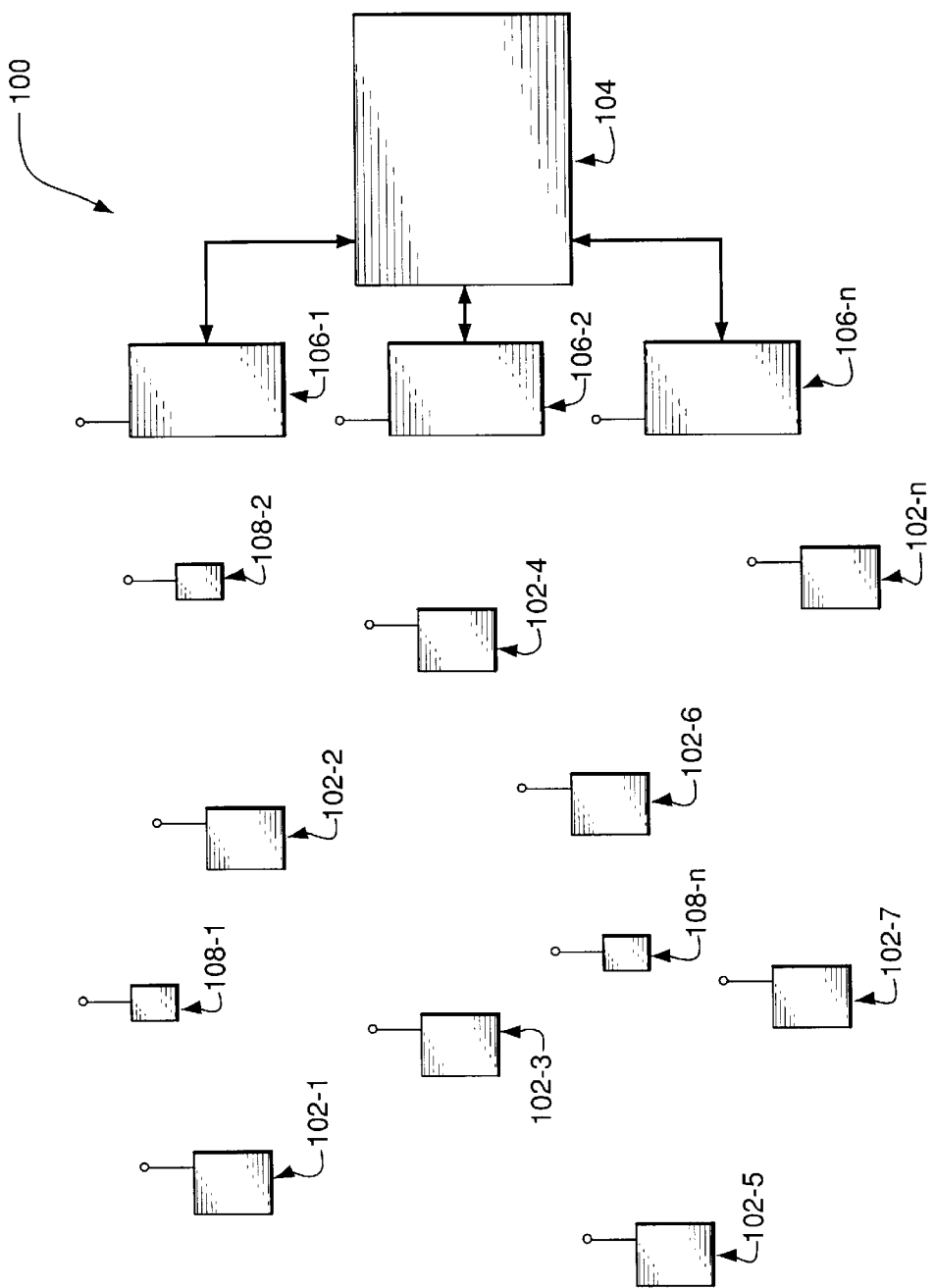
FIG. 1 is a block diagram of an example of an ad-hoc wireless communications network including a plurality of nodes.

FIG. 1 is a block diagram illustrating an example of an ad-hoc packet-switched wireless communications network 100 employing an embodiment of the present invention. Specifically, the network 100 includes a plurality of mobile wireless subscriber devices 102-1 through 102-n (referred to generally as mobile nodes 102), and a fixed network 104 having a plurality of access points 106-1, 106-2, . . . , 106-n, for providing the mobile nodes 102 with access to the fixed network 104. The fixed network 104 can include a core local access network (LAN) and a plurality of servers and gateway routers, to provide the mobile nodes 102 with access to other networks, such as the public switched telephone network (PSTN), the Internet or another wireless ad-hoc network. The network 100 also includes one or more fixed routers 108-1 through 108-n (referred to generally as fixed routers 108) for routing data packets between nodes 102, access points 106, and other routers 108.

Figure 2:
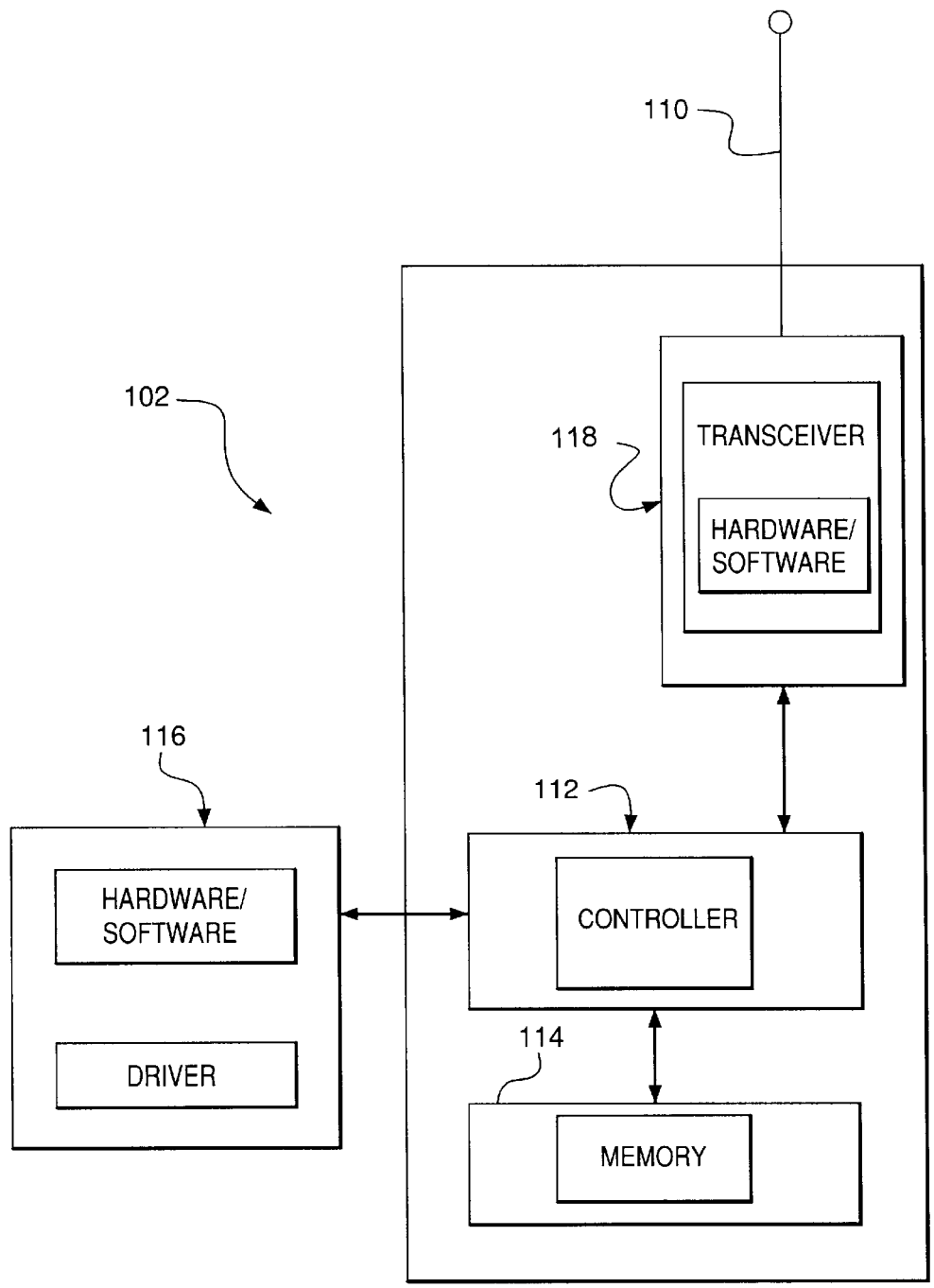
FIG. 2 is a block diagram of an example of a wireless node as shown in FIG. 1.

In FIG. 1, mobile nodes 102 are capable of communicating directly with each other, or via one or more other nodes operating as routers for data packets being sent between nodes, as described in U.S. Pat. No. 5,943,322 to Mayor and in U.S. patent application Ser. Nos. 09/897,790 and 09/815, 157, referenced above. As shown in FIG. 2, each mobile node of FIG. 1 includes a host 116 which may consist of any number of devices, such as a notebook computer terminal, mobile telephone unit, mobile data unit, or any other suitable device. Each node 102 further includes a transceiver 118, including a transmitter and a receiver, which collectively can be referred to as a modem. The transceiver is coupled to an antennae 110, capable transmitting and receiving signals, such as packetized data signals including voice, data or multimedia, under the control of a controller 112. Each controller 112 includes the appropriate hardware and software to perform Internet Protocol (IP) and Address Resolution Protocol (ARP), the purposes of which can be readily appreciated by one skilled in the art. The appropriate hardware and software to perform transmission control protocol (TCP) and user datagram protocol (UDP) may also be included.

Each mobile node further includes a memory 114, including a read only memory (ROM) for storing information pertaining to the operation of the node, and a random access memory (RAM) for storing information such as routing table information and the like, in accordance with data packets transmitted, received and routed by the transceiver 118. Further details of these types of ad-hoc networks are described in U.S. patent application Ser. No. 09/897,790 and in U.S. patent application Ser. No. 09/815,157, referenced above.

Each host 116 also includes the appropriate hardware and software to perform Internet Protocol (IP) and Address Resolution Protocol (ARP), the purposes of which can be readily appreciated by one skilled in the art. The host 116 can optionally include the appropriate hardware and software to perform transmission control protocol (TCP) and user datagram protocol (UDP). Furthermore, each host 116 includes a driver to provide an interface between the host and the transceiver 118.

In addition to including a modem, the transceiver 118 includes the appropriate hardware and software to provide IP, ARP, admission control (AC), traffic control (TC), ad-hoc routing (AHR), logic link control (LLC) and media access control (MAC). The transceiver 118 further includes the appropriate hardware and software for IAP association (IA), UDP, simple network management protocol (SNMP), data link (DL) protocol and dynamic host configuration protocol (DHCP) relaying.

Figure 3:
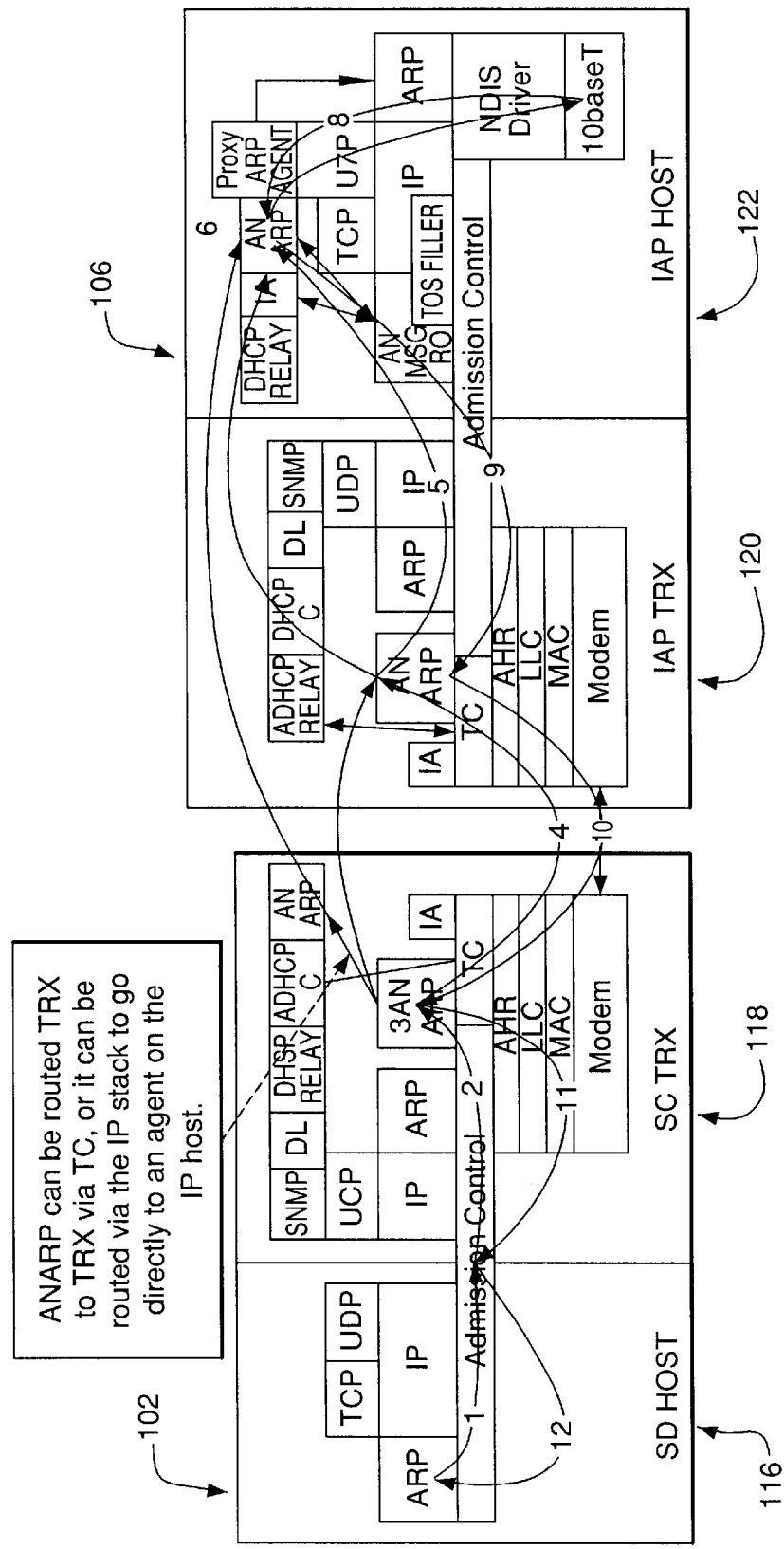
FIG. 3 is a block diagram illustrating an example of communication exchanges between a mobile node and an intelligent access point in the network shown in FIG. 1 when performing an address resolution in accordance with an embodiment of the present invention.

A more detailed description of the mobile node host and transceiver during communication with an associated IAP is shown in FIG. 3. In FIG. 3, the admission control (AC) module of the mobile node transceiver acts on packets flowing between the IP stack module of the host 116, and the IP stack module and traffic control (TC) module of the mobile node transceiver 118. The IP stack of the transceiver 118 will communicate directly with the AC module and the TC module passes formatted messages (i.e., those messages having Ad-Hoc Routing (AHR) headers) to the Logical Link Control module (LLC). The AC module also provides a number of services to these interfacing modules, including determination and labeling of Quality of Service (QoS) requirements for IP packets, throttling of higher-layer protocols, support of the Mobility Manager (not shown), and generation of appropriate responses to client service requests such as DHCP, ARP, and other broadcast messages. The AC module will rely on local broadcasts, ad hoc routing updates, and unicast requests for information destined to the associated IAP 106 to provide these services transparently to the IP stacks.

Further details of the operations and protocols described above are set forth in a U.S. Patent Application of Eric A. Whitehill entitled "Embedded Routing Algorithms Under the Internet Protocol Routing Layer in a Software Architecture Protocol Stack", Ser. No. 10/157,979, filed on May 31, 2002, the entire contents of which is incorporated herein by reference.

As further shown in FIG. 3, each IAP 106 includes an IAP host 122 and an IAP transceiver 120. The IAP host 122 includes the appropriate hardware and software to perform TCP, UDP, IP and ARP. Also, IAP host 122 includes the appropriate hardware and software to provide DHCP relaying, IA, a proxy ARP agent, and an NDIS driver. Furthermore, the IAP host 122 includes a driver to provide an interface between the IAP host 122 and the transceiver 120 in the IAP 106.

In addition to including a modem which can be similar to that in transceiver 118, the transceiver 120 includes the appropriate hardware and software to perform IP, ARP, AC, TC, AHR, LLC and MAC in a manner similar to that described above for the host 116 and transceiver 118. The transceiver 120 further includes the appropriate hardware and software for providing IA, UDP, SNMP, DL protocol and DHCP. Further details of the operations and protocols of IAP host and transceiver are discussed below and are set forth in U.S. patent application Ser. No. 10/157,979, referenced above.

In the following discussion, "frame" and "packet" are used interchangeably. A frame typically refers to a piece of link data at layer 2, the MAC layer. A packet typically refers to a piece of routable data at layer 3, as with IP. As known to those skilled in the art, during communication, frames are transmitted and packets are routed. Therefore as the routing layer discussed below is between layer 2 and layer 3, either term may be correctly used.

When an incoming packet destined for a host machine on a particular LAN arrives at a gateway on the LAN which is, for example part of the fixed network 104 shown in FIG. 1, the gateway requests that the ARP program find a physical host or MAC address that matches the IP address. The ARP program looks in the ARP cache at the gateway and, if it finds the MAC address, provides the MAC address so that the packet can be converted and formatted as appropriate and sent to the node. If no entry is found for the IP address in the ARP cache, the ARP program broadcasts a request packet in a special format to all the nodes on the LAN to see if any node recognizes that IP address as being associated with its MAC address. A node that recognizes the IP address as its own returns an affirmative reply to the ARP program. A node configured to respond to requests for IP addresses other than its own, for which it is said to proxy, returns an affirmative reply if it recognizes the IP address as one for which it is so configured. In response, the ARP program updates the ARP cache for future reference, and then sends the packet to the node having the MAC address associated with the IP address for which the packet is intended.

Cached address resolutions work well for wired-to-wired or wireless-to-wireless unicast communications, as it reduces the need to resolve every network packet individually. Network addresses are resolved to medium addresses once, then cached for future network packets. In a typical implementation, this cache may have an expiration timeout on the order of 20–120 minutes. Upon timeout, a given network address will be re-resolved to ensure reliable resolution for situations where network addresses of given nodes change periodically, such as the case with a DHCP-managed network.

As shown in FIG. 3, when a wireless mobile node 102 resolves network addresses of other devices on the wired medium, a medium address is determined that correlates to the node's associated IAP 106, which is presumed to be the best media bridge for the node to use. The best IAP 106 may be selected based on bandwidth, spectral efficiency, or other reasons specific to the network. However, given node mobility, the best IAP may not be static for a given mobile node. IAP associations may be formed and broken at a higher rate than the ARP expiration timeout would correct for. The MAC address for the IAP in the ARP cache therefore, may no longer reflect the best IAP, and depending upon ARP expiration timeout rates, the network could allow routing to less-appropriate IAP's.

The embodiment of the present invention shown in FIG. 3 modifies the address resolution protocol (ARP) to determine IP addresses which are subject to the dynamic link between mobile node and associated IAP. Once determined, the ARP resolves the wired network addresses of these IAP nodes to a particular well-known medium address, that is not used by any real node. The "unique" medium address associated with these IAP nodes may be referred to as a special type of "Cookie", which is easily identified by medium layer routing protocols. A medium frame addressed with this unique medium address is detected by the medium-layer routing protocols and routed to the node's currently associated IAP, at the moment the frame is sent. In doing so, the cached IAP MAC address is always current, regardless of changing links between mobile nodes and associated IAPs. The unique medium address assigned indicates an optimum IAP is subject to change, and medium-layer routing protocols should direct detection and route the frame to the currently associated IAP.

The modified ARP of FIG. 3 allows the network-layer ARP protocol to cache and use an entry that is always valid for a given network IAP MAC address so long as the network address does not, by way of DHCP or otherwise, migrate to the wireless medium, at least not more often than the ARP expiration timeout. The security issues mentioned which preclude a node from sending packets through a non-associated IAP, require one additional mechanism in the embodiment of the present invention. Since ad-hoc routed nodes may route through other nodes to reach an IAP, and intermediate routing nodes may be associated to different IAP's, the well-known address is not sufficient for actual frame addressing in the ad-hoc routing medium. An intermediate node would choose to route this type of addressed frame to its own associated IAP instead of the associated IAP of the frame's source. To prevent this, the medium layer routing protocols replace any such well-known address sent from the network layer with the actual medium address of the associated IAP, just as the frames are sent. This ensures proper delivery, even if intermediate nodes are associated to different IAP's.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A method for controlling a plurality of nodes in an ad-hoc communications network to perform address resolution protocol (ARP) on a frame by frame basis, each of said plurality of nodes being adapted to transmit and receive data packets to and from other nodes in said ad-hoc network, said method comprising controlling a first node of said plurality of nodes in generate an address resolution protocol (ARP) request for a first media access control (MAC) address corresponding to an optimum intelligent access point (TAP) for sending a medium frame;

controlling a second node to receive and identify said request, and provide a second MAC address, adapted to instruct said first node that said requested first MAC address is a dynamic link address; and controlling said first node to receive said second MAC address and in response, mute said medium frame to a current IAP.

2. A method as claimed in claim 1, wherein said ARP controls said flit node to generate said ARP request.

3. A method as claimed in claim 1, wherein said ARP controls said second node to identify an LAP MAC address corresponding to said dynamic link address, and to designate said second MAC address as the current address for said current LAP.

4. A method as claimed in claim 1, wherein said dynamic link address comprises IAP MAC addresses for said current LAP and associated mobile nodes which are subject to movement relative to one another.

5. A method as claimed in claim 1, wherein said ARP controls said second node to provide said second MAC address upon request for a MAC address corresponding to a dynamic link address.

6. A method as claimed in claim 1, wherein said current LAP comprises the IAP associated with said first node at the time said medium frame is sent.

7. A method as claimed in claim 1, wherein said ARP controls said first node to select said current IAP at the time said medium frame is sent.

8. A method as claimed in claim 1, wherein said current IAP is selected by said first node based upon quantitative factors including bandwidth and spectral efficiency.

9. A method as claimed in claim 1, wherein said second MAC address is included in network-layer ARP protocol.

10. A method as claimed in claim 1, further comprising updating said second MAC address may be updated upon ARP expiration timeout.

11. An apparatus adapted to perform address resolution protocol (ARP) on a flume by frame basis, and being further adapted to transmit and receive data packets to and from other nodes in an ad-hoc network, comprising:

a first node, adapted to generate an address resolution protocol (ARP) request fir a first media access control (MAC) address corresponding to an optimum intelligent access point (LAP) for sending a medium frame;

a second node, adapted to receive and identify said request, and to provide a second MAC address adapted to instruct said first node that said requested first MAC address is a dynamic link address; and said first node being further adapted to receive said second MAC address and in response, to route said medium frame to a current IAP.

12. An apparatus as claimed in claim 11, wherein said ARP is adapted to control said first node to generate said ARP request.

13. An apparatus as claimed in claim 11, wherein said ARP is adapted to control said second node to identify an IAP MAC address corresponding to said dynamic link address, and to designate said second MAC address as the current address for said current IAP.

14. An apparatus as claimed in claim 11, wherein said dynamic link address comprises IAP MAC addresses for said current IAP and associated mobile nodes which are subject to movement relative to one another.

15. An apparatus as claimed in claim 11, wherein said ARP is adapted to control said second node to provide said second MAC address upon request for a MAC address corresponding to a dynamic link address.

16. An apparatus as claimed in claim 11, wherein said current IAP comprises the IAP associated with said first node at the time said medium frame is sent.

17. An apparatus as claimed in claim 11, wherein said ARP is adapted to control said first node to select said current IAP at the time said medium frame is sent.

18. An apparatus as claimed in claim 11, wherein said current IAP is selected by said first node based upon quantitative factors including bandwidth and spectral efficiency.

19. An apparatus as claimed in claim 11, wherein said second MAC address is included in network-layer ARP protocol.

20. An apparatus as claimed in claim 11, wherein said second node is further adapted to update said second MAC address.

* * * * *